Jan. 1, 1963   G. CORNELIUS   3,071,327
ALIGNING MEANS FOR SPRINKLER TYPE IRRIGATION SYSTEMS
Filed Nov. 6, 1961   2 Sheets-Sheet 1
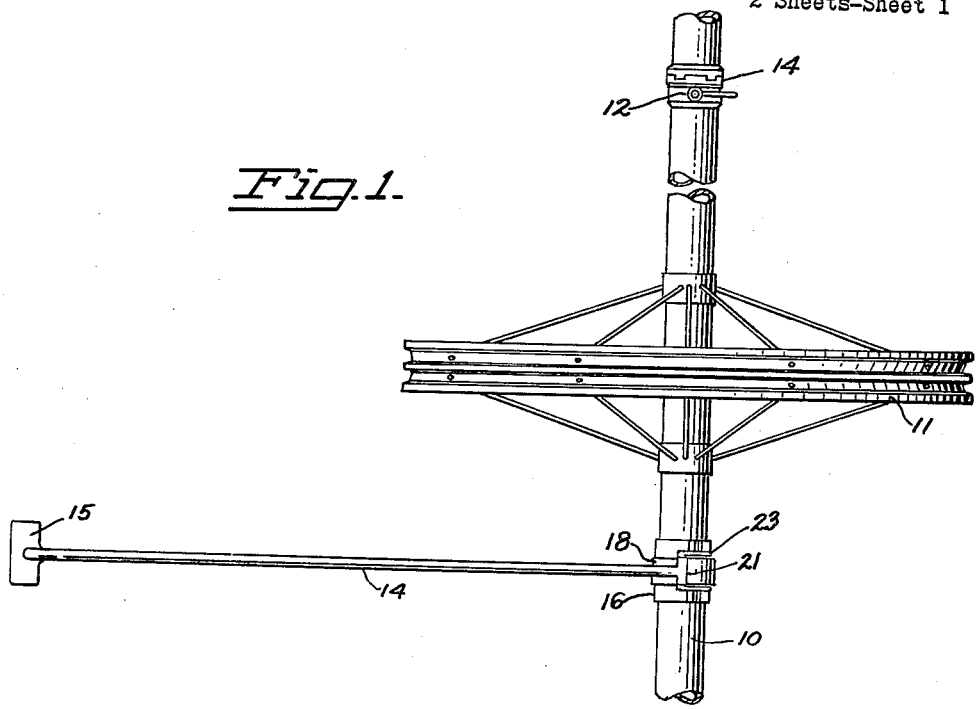
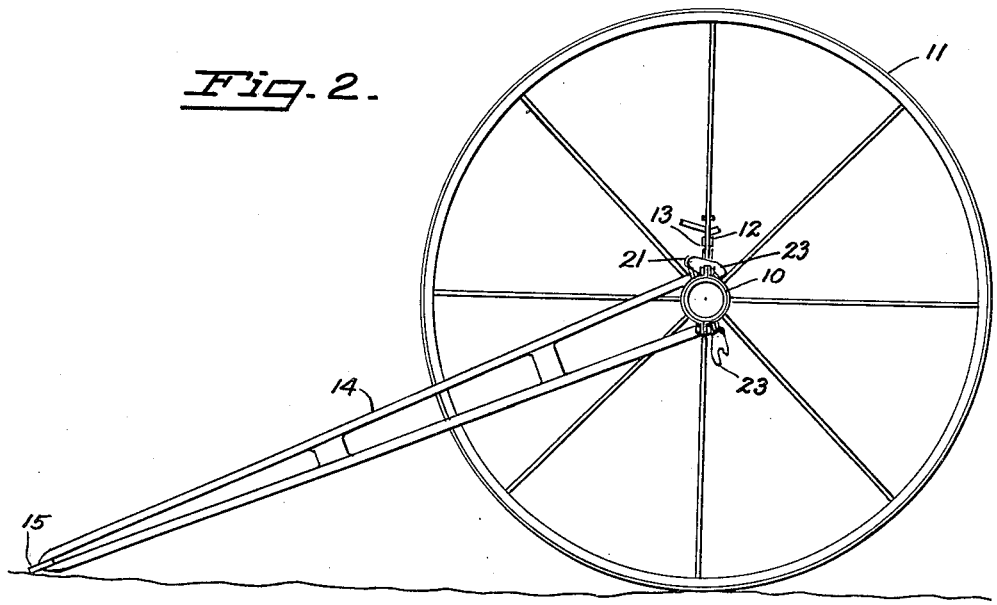
INVENTOR.
GAIL CORNELIUS
BY
Fryer + Tjensvold
ATTORNEY Jan. 1, 1963  G. CORNELIUS  3,071,327
ALIGNING MEANS FOR SPRINKLER TYPE IRRIGATION SYSTEMS
Filed Nov. 6, 1961  2 Sheets-Sheet 2
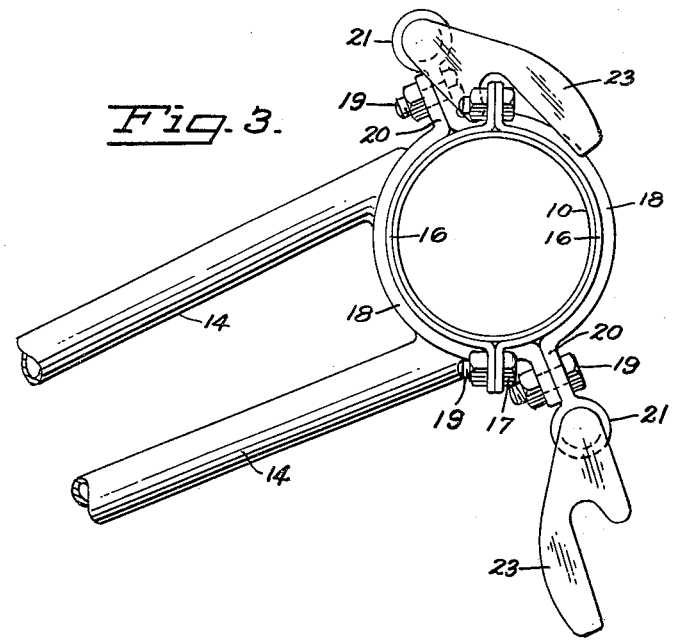
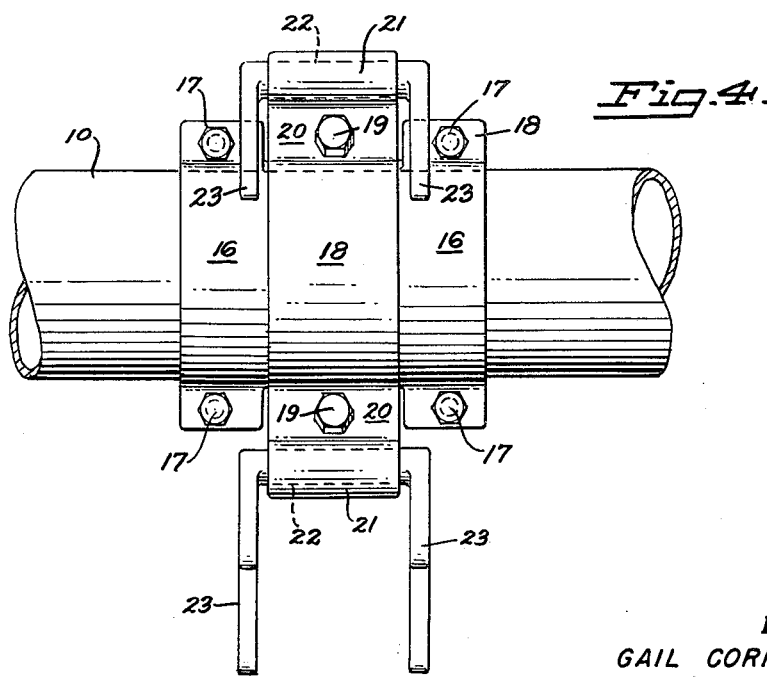
INVENTOR.
GAIL CORNELIUS
BY
ATTORNEY

United States Patent Office 3,071,327
Patented Jan. 1, 1963

3,071,327
ALIGNING MEANS FOR SPRINKLER TYPE IRRIGATION SYSTEMS
Gail Cornelius, Portland, Oreg., assignor to R. M. Wade & Co., Portland, Oreg., a corporation of Oregon
Filed Nov. 6, 1961, Ser. No. 150,487
3 Claims. (Cl. 239—212)

This invention relates to means for insuring proper alignment or vertical positioning of all sprinkler risers on a long movable type sprinkler line.

One type of irrigating equipment comprises a long line or conduit supported on wheels. The conduit extends through the hubs of the wheels in the manner of an axle and is fixed against relative rotation with respect to them. Sprinklers are connected with the conduit at spaced intervals by risers which extend vertically in use. After use for a suitable length of time in one area, the entire line is moved by applying torque with an engine or other suitable means centrally of the line so that the wheels are turned and the line advances to a new position parallel to and usually about 60 feet from its last position. This sprinkling and moving cycle is repeated until the entire field or area to be irrigated has been covered.

Lines of the type described above are often a quarter of a mile or more in length and this gives rise to difficulty where there is unusual resistance to travel of the wheels over the ground. For example, if the line is being moved up a hill, against a wind, in soft ground or in heavy crops the resiliency or spring in the line, which is usually of light aluminum tubing, will permit the ends to lag behind the middle where the driving torque is applied. Consequently only a few centrally disposed risers are vertical and the remaining risers toward both ends of the line lag behind the vertical position sometimes as much as 90°. It is a difficult and time consuming task for an operator to walk the full length of the line attempting to advance the two ends to positions in alignment with the center so that all sprinkler risers are vertical.

It is the object of the present invention to provide means to overcome the above related difficulties and to enable a line to be easily and quickly moved and adjusted to its proper position for use.

Further and more specific objects and advantages of the invention and the manner in which it is carried into practice are made apparent in the following specification by reference to the accompanying drawings.

In the drawings:

FIG. 1 is a plan view of a portion of a sprinkler-type irrigation line showing one of the supporting wheels thereof and one of a pair of devices constructed in accordance with the present invention;

FIG. 2 is a view in elevation of the apparatus shown in FIG. 1;

FIG. 3 is an enlarged fragmentary view of a portion of the apparatus shown in FIG. 2; and FIG. 4 is a view in elevation taken from the right side of FIG. 3.

Referring first to FIGS. 1 and 2, a segment of an irrigation line is shown at 10. The line is supported by spaced wheels, one of which is shown at 11 and which are secured by any suitable means against rotation with respect to the line. The line also carries a plurality of sprinklers 12 of a conventional type supported on risers, one of which is shown at 13 in FIG. 2. These risers generally extend upwardly from couplings 14 which serve to connect separate links of tubing which make up the line. The couplings are also of well known construction. The present invention comprises a ground engaging arm shown at 14, one of which is pivotally supported with respect to the line 10 adjacent each of its ends in a manner to permit the arm to trail on the ground when the line is being moved. The trailing end of the arm is preferably provided with a small plate 15 or of a similar device adapted to engage and bite into the ground upon tendency of the line to move in a rearward direction, it being understood that the direction of intended movement of the line is to the right as viewed in FIGS. 1 and 2.

The manner of connecting the arm 14 to the line is best illustrated in FIGS. 3 and 4. In these figures, a pair of semi-cylindrical members 16 embraces and is clamped to the line by bolts 17 which pass through mating flanges 18 disposed adjacent opposite ends of the semi-cylindrical parts. The arm 14 is secured as by welding to one of two separable collar members 18 which embrace the members 16 and are secured to each other as by bolts 19 passing through mating flanges 20. The collar members 18 embrace the members 16 loosely so that they are rotatable thereon and the arm supported by them is free to drag on the ground in the position shown in FIG. 2 as the line is advanced.

One of each pair of the flanges 20 extends radially outwardly beyond the other and has a bearing 21 formed at its outer end for the pivotal reception of a shaft shown in dotted lines at 22 in FIG. 4. This shaft has a pawl 23 at each of its opposite ends. When the line is being advanced to the right, the parts assume the position illustrated in FIGS. 2 and 3 and the flanges 18 on the member 16 act as ratchet teeth which pass beneath the pivoted pawl as the line and parts secured thereto turn in a clockwise direction.

In operation, and assuming that the irrigation line is being advanced to the right as viewed in FIGS. 2 and 3 and that there is a resistance to forward movement which tends to cause the extreme ends of the line to lag behind the central portion of the line, forward movement is continued until the ends of the line are in the desired position and until the uppermost of the pawls 23 has fallen in place as shown in FIG. 3 to prevent reverse movement of the line adjacent both its ends by engagement with the ratchet tooth, formed by the flanges 18 on the members 16, which is on the same side of the line as the sprinklers. At this time, the sprinkler risers adjacent the ends of the line will be in vertical positions and those at the center of the line will be advanced beyond their vertical positions. It is then simply necessary to reverse the direction of the force which moves the line centrally thereof and to move the center of the line back into alignment with the opposite ends while the ends are held against this reverse movement by the pawls 23 and engagement with the ground of the outer ends of the arms 14.

During the entire operation described above, the lower set of pawls 23 has been dangling in an idle position as illustrated in FIG. 3. When the line is moved in the reverse direction across the field or to the left as viewed in FIG. 2, the position of the arms 14 is reversed by swinging them upwardly and over the line 10 until their outer ends engage the ground on the right side thereof. When this has been done, the idle pawls 23 of FIG. 3 will have been brought to the uppermost position for acting in the opposite direction with the ratchet teeth while the uppermost pawls of FIG. 3 will in turn hang idly at the lower position.

There are also instances in which the outer ends of the line move in advance of the central portion thereof as for example when the line is being moved down hill or in the direction of a strong wind. In such cases when the line is in approximately the position desired, the operator may walk to each end of the line and reverse the position of the arms 14 so that the uppermost pawls 23 prevent further forward movement of the ends of the line. Further forward movement of the central portion of the lines will then bring it into alignment with the ends with all the sprinklers throughout the length of line in their intended vertical positions.

A single pawl may be employed in place of each of the pairs of pawls shown to produce the same effect and more elaborate ratchet teeth may be provided for engagement by the pawls. However the structure illustrated represents a simple inexpensive and well balanced structure which acts positively and efficiently to accomplish its intended purpose.

I claim:

1. Aligning means for a sprinkler irrigation line which is supported on wheels and moved over the ground by force applied intermediate its ends which comprises an arm pivotally supported with respect to the line adjacent each end of the line and adapted to drag on the ground as the line is moved in one direction to engage the ground and prevent movement of the ends of the line in the opposite direction, and ratchet and pawl means acting between the arms and the line when the sprinkler means are positioned for use at the ends of the line whereby the position of the center of the line may be adjusted to bring its sprinkler means into position for use.

2. The combination of claim 1 in which the arms are mounted to swing over the line to drag on the opposite side thereof when the direction of movement of the line is reversed.

3. In combination with a long sprinkler line supported on wheels coaxial therewith and having sprinklers extending radially therefrom at spaced intervals for use in vertical positions, means to compensate for lagging or advancing of the ends of the line when it is moved by force applied between its ends which means comprises a ratchet tooth fixed with respect to the line, an arm pivoted coaxially with respect to the line to drag on the ground behind the line, and a pawl for engagement with the ratchet tooth to prevent reverse movement of the line, said pawl being oriented to so engage said ratchet tooth when the sprinklers adjacent the ends of the line are in vertical positions.

References Cited in the file of this patent
UNITED STATES PATENTS
2,892,466    Stilwell _____ June 30, 1959